INVENTORS
FLOYD E. FORD, PIOTR P.M. LIWSKI
NELSON H. POTTER, KENNETH O. SIZEMORE

INVENTORS.
FLOYD E. FORD
PIOTR P. M. LIWSKI
NELSON H POTTER
KENNETH O SIZEMORE

United States Patent Office 3,447,059
Patented May 27, 1969

3,447,059
SHUNT CHARGE CURRENT CONTROLLER FOR SEALED ELECTROCHEMICAL CELLS WITH CONTROL ELECTRODES
Floyd E. Ford, Davidsonville, Piotr P. M. Liwski, Annapolis, and Nelson H. Potter, Berwyn Heights, Md., and Kenneth O. Sizemore, Washington, D.C., assignors to the United States of America as represented by the Secretary of the Navy
Filed Oct. 25, 1966, Ser. No. 589,778
Int. Cl. H02j 7/10, 7/04
U.S. Cl. 320—27                             18 Claims

ABSTRACT OF THE DISCLOSURE

A system for charging a storage battery with a control electrode. The circuit responds either to the overall battery voltage or to the voltage on the control electrode of any individual cell. As a predetermined voltage is reached, a current dump shunt regulator is energized to divert the charging current away from the battery to ground.

Figure 1:
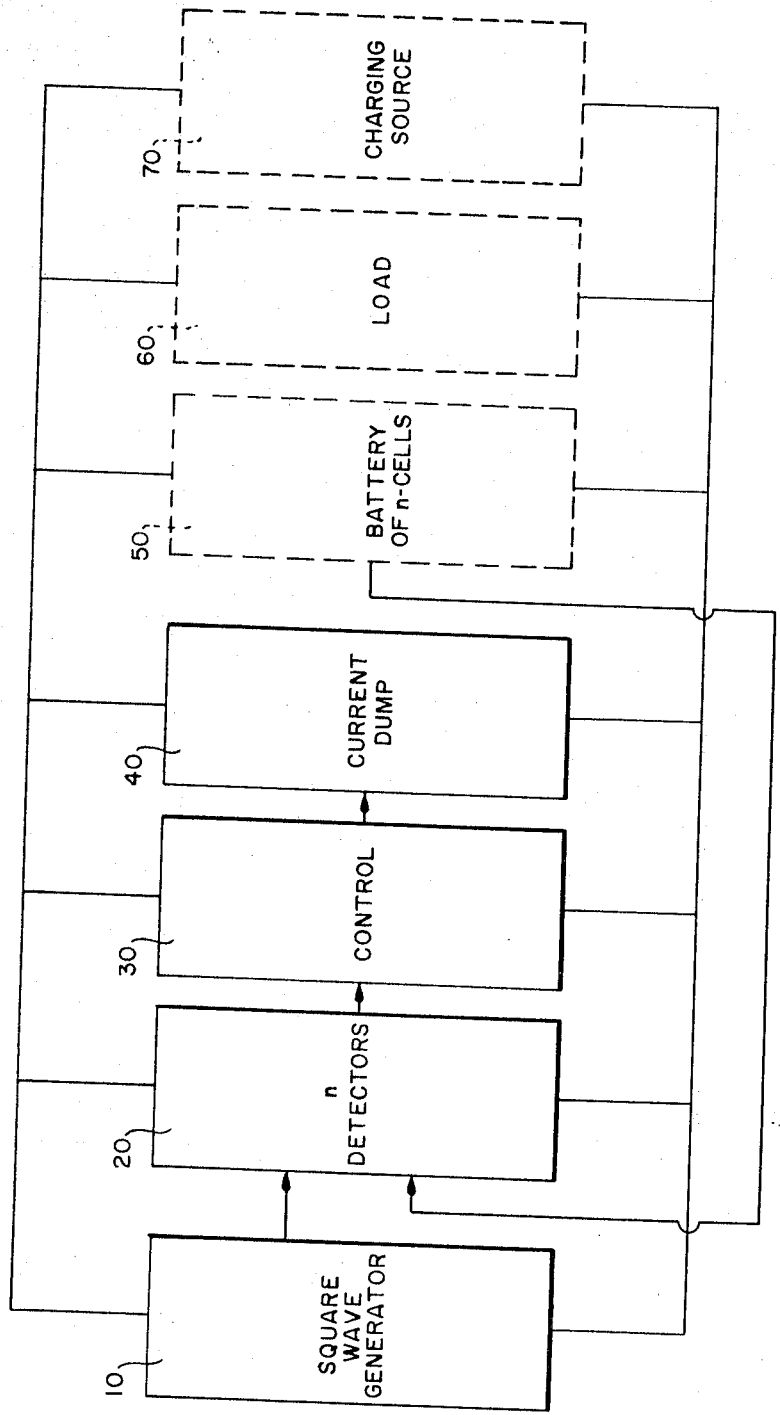

The invention described herein may be manufactured and used by or for the Government of the United States of America for governmental purposes without the payment of any royalties thereon or therefor.

---

This invention relates to battery charging systems and more particularly to a system for charging electrochemical cells of the nickel-cadmium type having control electrodes.

The use of nickel-cadmium cells has become extremely widespread in the electronics industry in recent years in equipment ranging from spacecraft to hearing aids. Such cells offers the advantages of being highly efficient, compact and reliable; they can be recharged an indefinite number of times and, unlike other types of secondary cells, can be hermetically sealed since it is not necessary to add electrolyte and there is no problem of leakage and spillage of fluid. In addition, they offer extremely long life under a wide range of operating conditions.

The advantages of such cells become disadvantages, however, in certain instance. While the cells are being recharged, oxygen gas is liberated at the nickel electrode. Although oxygen gas is generated slowly during most of the charging period, as the coil approaches its maximum rated charge condition the amount of oxygen evolved increases rapidly which condition will continue as the cell becomes overcharged. Because the cells are hermetically sealed the gas pressure under these conditions may rise to dangerously high levels which can result in an explosion or otherwise cause damage to the cells as well as neighboring equipment.

This problem is complicated by the fact that the nickel cadmium cells have a relatively flat terminal voltage versus cell capacity characteristic. Consequently, monitoring the terminal voltage to ascertain the state-of-charge (the common technique with most secondary cells) is of no value when dealding with nickel-cadmium cells. Accordingly, it has been difficult to maintain such cells at 100 percent of rated capacity by known automatic charging techniques. More often than not, the cells were either undercharged, resulting in reduced capability or overcharged, risking the danger of an explosion.

Recently, there has been developed a nickel-cadmium cell which has a third control electrode in addition to the anode and cathode. This control electrode develops a voltage potential with respect to the cell anode (negative electrode) as a direct function of the number of oxygen molecules in the cell.

The invention described herein is a modification of the system disclosed in application Ser. No. 550,090, filed May 11, 1966, and contemplates a system for automatically charging a group of cells connected in series configuration. A detector section, containing a detector for each cell, samples the control electrode potential of its respective cell at a rapid sampling rate provided by a square wave generator. The output of each of the detectors is a D-C level which is fed to a current control section which adjusts the conductance of the current dump section which acts as a variable impedance across an external supply thereby varying the charging current from full to trickle charge or zero as the control electrode voltage increases. The charge current control utilizes an entirely solid state series control network to control the rate of charge.

Accordingly, it is an object of this invention to provide a system for automatically charging sealed electrochemical cells of the type having a control electrode.

Another object of this invention is to provide a system for maintaining nickel-cadmium batteries of the control electrode type in an optimum charged state.

A further object of this invention is to provide a systetm for continually monitoring the state-of-charge of control electrode type cells.

A still further object of this invention is to provide a battery charging system which is entirely solid state and requires no mechanical components.

Figure 2:
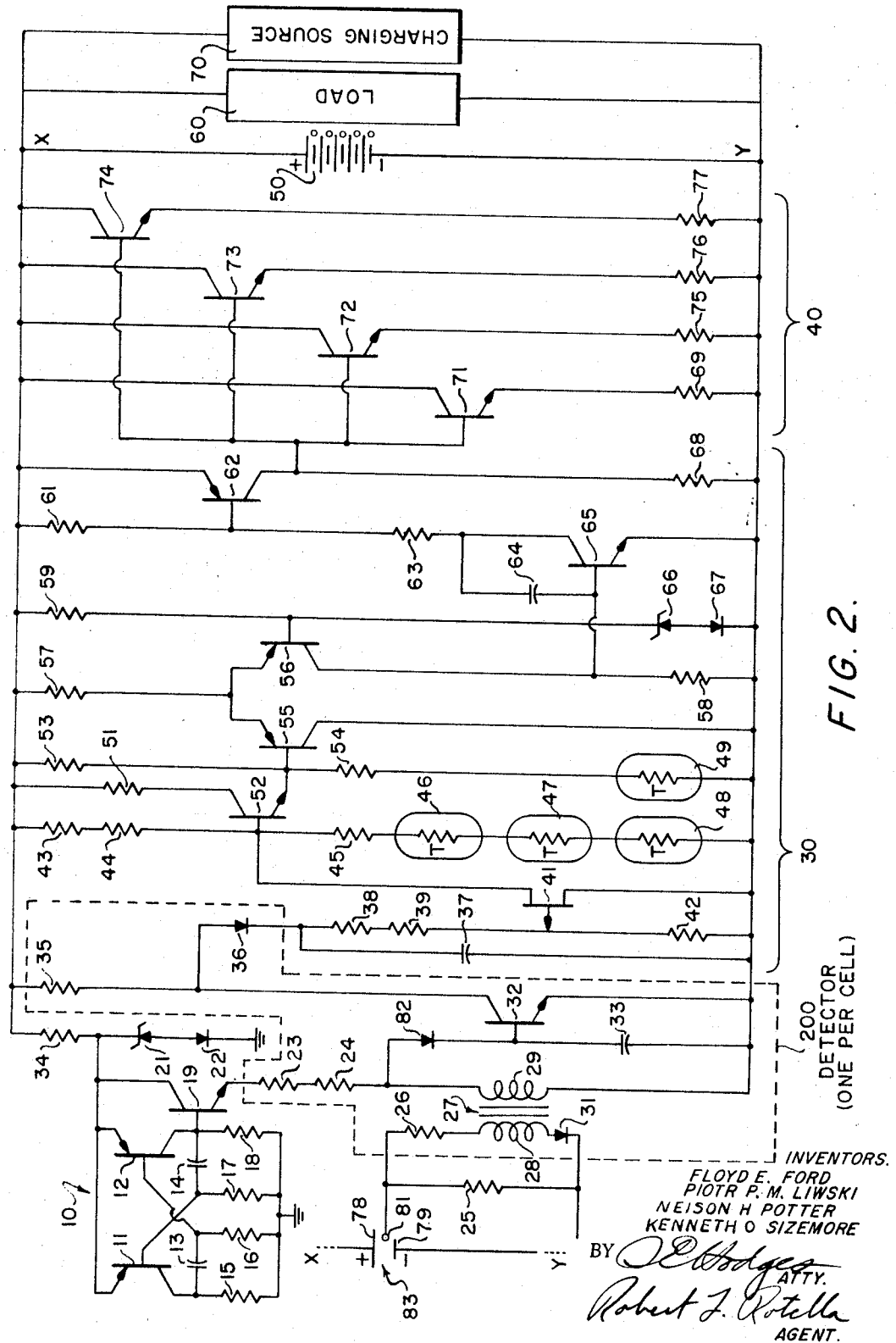

Other objects and advantages of this invention will become apparent from the following description and drawings wherein:

FIG. 1 is a block diagram representation of the various components comprising the invention; and FIG. 2 is a circuit diagram of the battery charging system.

Referring now to FIG. 1 there is shown a block diagram representation of the invention in which all the subsystems are connected in shunt relationship. A battery 50 of cells each connected in series configuration is shunted by the load 60 which is to be actuated and a source of battery charging current 70. Each of the cells comprising battery 50 is of the hermetically sealed electro-chemical type such as nickel-cadmium cells. Referring now to FIG. 2, each of the cells 83 is provided with a positive electrode (cathode) 78 and a negative electrode (anode) 79. In addition each cell 20 is provided with a third electrode 81 which is utilized for control purposes. Control electrode 81 is adapted to provide a voltage potential (with respect to anode 79) proportional to the number of oxygen molecules in the cell which become liberated as the cell is recharged. It is a characteristic of cells of the nickel-cadmium type that oxygen gas is evolved during charging. The rate of oxygen liberation is relatively slow until the cell approaches its maximum charge condition when the rate of liberation increases rapidly. Thus, the charge condition of the cell is ascertainable from the amount of oxygen gas present in the hermetically sealed cell and the voltage potential caused thereby on the control electrode.

It is to be understood that the invention may be utilized with any other type of cell having a control electrode which develops a potential responsive to the state-of-charge of the cell, including two-terminal type cells. For example, the cell disclosed in U.S. Patent No. 2,988,590, may be advantageously used in accordance with the principles of this invention.

A further application of the invention would be in conjunction with cells having pressure transducers which convert internal gas pressure (caused by charging) to a voltage potential.

Referring to FIG. 1 again, the shunt charge control system comprises a series of subsystems connected in parallel arrangement to form, effectively, a shunt voltage regulator. Connected to the control electrode of each of the cells in battery 50 is a lead which feeds the input of the detector network 20. Detector network 20 comprises a separate detector associated with each of the cells in battery 50 as will be more fully described, hereinafter. The output of a square wave generator 10 is fed to the detector network 20 for providing a switching signal thereto for sampling the control electrode potential of the respective cells.

The detector network 20 output is connected to control network 30 which amplifies and feeds to the current dump section 40, the detected signal. The current dump section 40 acts as a voltage controlled variable impedance. As the input voltage from the detector network 20 and control network 30 increases (together with the increasing control electrode potential) the effective impedance of the current dump section 40 becomes lower. Since the current dump is in shunt relation with the other components in the system as its effective impedance decreases more current from the charging source 70 will flow through it thus diverting current from the battery 50.

The circuit components are adjusted so that maximum charging current is furnished to battery 50 when in a state of discharge. As the cells in battery 50 near their fully charged condition, gas is generated rapidly in each cell, producing a rising control electrode potential. When any one control electrode potential reaches a preset "initiation" value, the current dump section 40 will become conductive. As the control potential increases, the current dump section 40 conducts an increasing amount of current due to its lowered impedance to ground thus shunting away charging current from battery 50. This action continues until any one cell's potential reaches a preset "final" value at which point the current dump section 40 is shunting virtually all of the available current from source 70 to ground. The effective impedance of current dump 40 has been lowered to a point such that the terminal voltage of the regulator has been damped at the proper value considering the number of cells in battery 50 and ambient temperature. The battery 50 will then "float" on the regulator and receive barely enough current to maintain the terminal voltage at the lower clamped value.

If the overall terminal voltage of battery 50 should reach a maximum predetermined value before any of the cells reach the preset "final" value, the shunt regulator will clamp at the said maximum value as with any shunt voltage regulator. Then, if any cell's control electrode potential rises beyond the "final" preset value the system terminal voltage will be reduced and clamped in the lower voltage condition.

Referring now to FIG. 2 for a more complete description of the shunt charge current controller circuit, a battery 50 comprises a plurality of cells, of the type heretofore described, having control electrodes, connected in series. Connected in parallel across battery 50 is any suitable load 60 which is to be energized as well as a source of charging current 70. Each cell 83 comprises an anode 79, cathode 78 and control electrode 81.

The detector network 20 comprises an individual detector 200 connected to the control electrode 81 of each cell 83. Each detector 200 includes a transformer 27 having its primary winding 28 connected through a resistor 26 to the control electrode 81 and through a diode 31 to anode 79. A resistor 25 is connected in parallel between the control electrode and the anode of cell 83.

The secondary winding 29 of transformer 27 is connected through one end to resistors 23 and 24 to the output of the square wave generator 10. The other end of winding 29 is grounded. A diode 82 and capacitor 33 are connected between winding 29 and resistor 24 and ground. Transistor 32 has its base connected between diode 82 and capacitor 32. The collector of transistor 32 is connected through resistor 35 to the bias voltage supply line and the emitter is grounded. The output of the detector 200 is fed through diode 36 to the input of the control network 30. The individual detectors 200 which comprise detector network 20 are connected in common at the respective cathodes of diode 36.

The square wave generator 10 comprises a standard astable multivibrator fed into an emitter follower stage which provides a switching voltage for the detector network 20. Square wave generator 10 comprises transistor 11 and 12 having their emitters connected to each other. The collectors of transistors 11 and 12 are connected to ground through resistors 15 and 18, respectively. The base of transistor 11 is connected to the collector of transistor 12 via capacitor 14, while the base of transistor 12 is connected to the collector of transistor 11 via capacitor 13. A resistor 16 is connected between the base of transistor 12 and ground and a resistor 17 is connected between the base of transistor 11 and ground.

Transistor 19 is connected as an emitter follower with its base connected to the collector and its collector connected to the emitter of transistor 12. The emitter of transistor 19 feeds the input of the detector 200 through resistors 23 and 24. The square wave generator 10 is powered through resistor 34 connected to the bias supply line. Zener diode 21 and diode 22 connected between ground and resistor 34 provide a constant supply voltage for the square wave generator.

The operation of the detector is as follows: resistor 25 serves as a leakage resistor for the potential developed between control electrode 81 and the negative terminal 79 of cell 83. When cell 83 is in a state of discharge, its control electrode 81 potential is nearly zero volts. Thus, diode 31 is reverse biased and no current flows through the primary winding 28 of transformer 27.

It can be demonstrated that the combination of diode 31, winding 28 and resistor 26 on the primary side of transformer 27 will "reflect" onto the secondary side with the following characteristic: as the voltage across the primary side increases the current through resistor 26, winding 28 and diode 31 increases and their reflected impedance decreases. Consequently, as the control electrode potential increases, the reflected impedance decreases.

Under the zero control electrode potential condition, the square wave switching signal fed through resistors 23 and 24 to the primary side of the detector will experience a high reflected impedance. Consequently, most of the energy contained in the square wave will be stored in capacitor 33, since the path through diode 82 and the capacitor to ground is a lower impedance than the reflected impedance. This allows capacitor 33 to maintain a D-C voltage level sufficient to bias transistor 32 in saturation. As the cell 83 charges, its control electrode potential increases thus allowing a low D-C current to flow through diode 31, resistor 26 and primary winding 28 of transformer 27. As this current increases (with an increasing control electrode potential) the dynamic impedance of diode 31 decreases, thus lowering its reflected impedance as seen by the square wave. As this impedance decreases, more energy is dissipated through transformer 27 and less is stored in capacitor 33. This will lower the D-C voltage maintained by capacitor 33 and will cause transistor 32 to travel through its active region toward cutoff. When transistor 32 is near saturation its collector voltage is held at less than one volt, but as it moves through the active region toward cutoff, its collector voltage increases toward a maximum value nearly equal to the bias voltage. With diodes 36 of each detector 200 connected at their cathodes, they act as an OR circuit, meaning that the detector voltage having the highest value is the voltage which appears at the input to the control network 30. Therefore, it is this input which will control the control network.

Control network 30 comprises field-effect transistor (FET) 41 having its gate electrode connected through resistors 38 and 39 to the detector 200 output and to ground through resistor 42. Capacitor 37 is connected between resistor 38 and ground. The drain electrode of FET 41 is connected to the base of transistor 52 while the source electrode is grounded. The base of transistor 52 is connected to the bias supply line through resistors 43 and 44 and to ground through resistor 45 and thermally sensitive resistors 46, 47 and 48. The thermally sensitive resistors preferred in this embodiment are silicon resistors having a particular positive temperature coefficient, known as sensistors.

The collector of transistor 52 is connected to the bias supply line through resistor 51 and the emitter to the supply through resistor 53. The emitter is also connected to ground through resistor 54 and sensistor 49. Transistors 55 and 56 are connected as a differential amplifier with the emitters tied together and through resistor 57 to the bias supply line. The collector of transistor 55 is grounded directly while the collector of transistor 56 is grounded through resistor 58. The emitter of transistor 52 feeds the base of transistor 55. The base of transistor 56 is connected to the bias supply through resistor 59 and to ground through diode 67 and Zener diode 66.

Transistor 65 has its base connected to the collector of transistor 56, its emitter grounded and its collector connected to the bias supply through resistors 61 and 63. A capacitor 64 is connected between the base and collector of transistor 65. Transistor 62 has its base connected between resistors 61 and 63, its collector grounded through resistor 68 and its emitter connected to the bias supply.

Control network 30 performs a twofold function. It acts as the feedback loop of the shunt voltage regulator by monitoring the system terminal voltage and differentially amplifying it. The voltage divider formed by resistors 53 and 54 and sensistor 49 monitors the system terminal voltage and applies a fraction of it to the base of transistor 55. The differential amplifier formed by transistors 55 and 56 compares this voltage with a standard furnished by diode 67, Zener diode 66 and resistor 59. If the system terminal voltages exceeds a predetermined value, the differential amplifier will furnish an error signal causing transistor 65 to conduct further. This causes transistor 62 to also conduct increasingly since it is connected directly to transistor 65 and thus increases the output voltage of the control network 30.

Control network 30, in addition, amplifies the output of detector 200, adjusts it according to the desired temperature characteristic and applied the signal to the current dump section 40.

The detector output signal is fed to the gate of field-effect transistor (FET) 41 through resistors 38 and 39. Resistors 43, 44 and 45 and sensistors 46, 47 and 48 form a voltage divider. The FET 41 functions as a variable impedance across elements 45, 46, 47 and 48. As the output from detector 200 increases with an increase in control electrode voltage, the effective impedance of FET 41 increases causing a higher voltage to appear at the base of transistor 52 increasing its conduction. As described above, when transistor 52 increases conduction, transistor 55 acts similarly. Thus, the effect is similar to an increase in the system terminal voltage and the circuit acts as described above until the output voltage of the control network 30 is increased due to an increase in the output of detector network 20.

The current dump section 40 comprises transistors 71, 72, 73 and 74 having their bases tied together and connected to the collector of transistor 62 and having their collectors connected to the bias supply line. The emitters of transistor 71, 72, 73 and 74 are connected to ground through resistors 69, 75, 76 and 77, respectively.

The current dump section operates as follows: a rising output from control network 30 is applied directly to the common base connection of transistors 71–74 and causes them to conduct enough current from charging source 70 so that its terminal voltage is kept beneath a fixed value. Resistors 69, 75, 76 and 77 act as balancing elements for the current dump transistors by introducing feedback. The choice of number of dump transistors is made on the basis of heat dissipation and environmental requirements.

The system terminal voltage is temperature compensated by means of sensistors 46–49, heretofore described. If ambient temperature increases, the resistance of sensistor 49 will increase raising the base bias voltage of transistor 55 which causes the system terminal voltage to be lowered. Similarly, sensistors 46, 47 and 48 will have an increasing resistance with increasing temperature thus increasing the base bias voltage on transistor 52 which will cause the system terminal voltage to be lowered.

A number of adjustments are provided in the circuit so that a wide range of operating characteristics is obtainable. The number of detectors 200 can be selected to match the number of cells 83 in battery 50. Resistor 54 is selected to set the level of the upper clamped voltage since it controls the amount of base bias to transistor 55. Increasing resistor 54 raises the level of the upper clamped voltage. The lower clamped voltage is set by choosing resistor 43 which controls the base bias of transistor 52.

Having described the invention, it will be apparent that many modifications will be obvious to one skilled in the art, and consequently, the scope of the invention is to be measured solely by the following claims.

What is claimed is:

1. A system for charging a battery of cells of the sealed electrochemical type having a control electrode whose voltage potential is indicative of the state-of-charge comprising:
    a source of current for charging cells and being connected to said cells;
    detector means connected to the control electrode of said cells and responsive to the voltage potential of said control electrode;
    monitoring means responsive to the terminal voltage of said battery and the output of said detector means;
    variable impedance current dump means for controlling said charging current source; and
    said variable impedance current dump means being controlled by said monitoring means.

2. A system as set forth in claim 1 wherein:
    said charging current source, said monitoring means, said variable impedance current dump means and said battery are connected in respective shunt relation.

3. A system as set forth in claim 2 wherein:
    said detector means includes a primary circuit and a secondary circuit;
    said primary circuit being connected to said control electrode;
    said secondary circuit being connected to said monitoring means;
    means for supplying energy to said secondary circuit;
    said primary circuit reflecting its impedance onto said secondary circuit; and
    energy storage means connected to said second circuit;
    said control electrode voltage potential causing said reflected impedance to vary, thereby varying the energy stored in said energy storage means.

4. A system as set forth in claim 3 wherein:
    said monitoring means compares the terminal voltage of said battery and a reference voltage.

5. A system as set forth in claim 4 wherein:
    said monitoring means includes differential amplifier means for generating an error signal in response to a deviation in said battery termial voltage.

6. A system as set forth in claim 5 wherein:
    said differential amplifier includes first and second transistors;
    said transistors being connected in common at the emitters thereof;
    said common emitter connection being connected to one terminal of said battery;
    the collection of said transistors being connected to the other terminal of said battery.

7. A system as set forth in claim 6 further including:
first voltage divider means connected to the base electrode of said first transistor and the terminals of said battery.

8. A system as set forth in claim 7 wherein:
said first voltage divider means comprises a resistor connected between said base electrode and one terminal of said battery and first thermally responsive means connected between said base electrode and the other electrode of said battery.

9. A system as set forth in claim 8 wherein:
said first thermally responsive means comprises thermally sensitive resistor.

10. A system as set forth in claim 9 wherein:
said resistor has a positive coefficient of temperature.

11. A system as set forth in claim 10 wherein:
said reference voltage is maintained by a Zener diode connected between the base of said second transistor and a terminal of said battery.

12. A system as set forth in claim 11 wherein:
the output of said detector means is connected to variable impedance means.

13. A system as set forth in claim 12 wherein:
said variable impedance means comprises a field-effect transistor;
the output of said field-effect transistor being connected to the input of said differential amplifier means.

14. A system as set forth in claim 13 further including:
a third transistor connected between the input of said differential amplifier and the output of said field-effect transistor; and
second voltage divider means connected to the base electrode of said third transistor and the terminals of said battery.

15. A system as set forth in claim 14 wherein:
said second voltage divider means comprises a resistor connected between the base electrode of said third transistor and one terminal of said battery and second thermally responsive means connected between said base electrode and the other electrode of said battery.

16. A system as set forth in claim 15 wherein:
said second thermally responsive means comprises a plurality of thermally sensitive resistors having a positive coefficient of temperature.

17. A system as set forth in claim 16 wherein:
said variable impedance current dump means comprises a plurality of transistors having their base electrodes connected in common and to the output of said monitoring means and having their collector and emitter electrodes connected to respective terminals of said battery.

18. A system as set forth in claim 17 wherein:
resistors are connected between each of said emitters and said respective battery terminal.

References Cited

UNITED STATES PATENTS

| | | | |
|---|---|---|---|
| 3,124,698 | 3/1964 | Semmer et al. | 323—22 X |
| 3,315,140 | 4/1967 | Dadin | 320—48 |
| 3,348,118 | 10/1967 | Watrous | 320—40 |

JOHN F. COUCH, *Primary Examiner.*

STANLEY, WEINBERG, *Assistant Examiner.*

U.S. Cl. X.R.

317—16; 320—39